United States Patent
Miyano

(10) Patent No.: US 6,832,534 B2
(45) Date of Patent: Dec. 21, 2004

(54) METHOD AND APPARATUS FOR WITHDRAWING BAR STOCK FROM A BAR STOCK FEEDER

(76) Inventor: Toshiharu Miyano, 50 Dundee La., Barrington Hills, IL (US) 60010

( * ) Notice: Subject to any disclaimer, the term of this patent is extended or adjusted under 35 U.S.C. 154(b) by 131 days.

(21) Appl. No.: 10/140,419

(22) Filed: May 6, 2002

(65) Prior Publication Data

US 2003/0205116 A1 Nov. 6, 2003

(51) Int. Cl.⁷ .......................... B23B 3/00; B23B 13/00; B23B 3/36
(52) U.S. Cl. .............................. 82/1.11; 82/127; 82/152
(58) Field of Search ..................... 82/1.11, 124, 126, 82/127, 152, 125

(56) References Cited

U.S. PATENT DOCUMENTS 3,582,000 A * 6/1971 Werkmeister et al. ........ 414/14
3,703,112 A * 11/1972 Selby .......................... 82/127
3,924,494 A * 12/1975 Azuma ......................... 82/126
5,911,803 A * 6/1999 Miyano ........................ 82/1.11

* cited by examiner

*Primary Examiner*—A. L. Wellington
*Assistant Examiner*—Brian D. Walsh
(74) *Attorney, Agent, or Firm*—Wood, Phillips, Katz, Clark & Mortimer

(57) ABSTRACT

A method of processing a piece of bar stock material having spaced ends and a predetermined diameter and including the steps of: attaching an adaptor to one end of the piece; directing the piece into a feeder sleeve bounding an internal passageway; moving the piece in the internal passageway from an upstream end toward a downstream end so as to expose a part of the piece for processing; performing at least one processing step on the exposed part of the piece; engaging a retrieval assembly with the adaptor; extending at least a part of the retrieval assembly into the internal passageway from a downstream end of the at least part of the retrieval assembly to a predetermined distance in an upstream direction; and with the retrieval assembly engaged with the adaptor, repositioning the retrieval assembly to thereby reposition the piece within the internal passageway.

27 Claims, 6 Drawing Sheets

METHOD AND APPARATUS FOR WITHDRAWING BAR STOCK FROM A BAR STOCK FEEDER

BACKGROUND OF THE INVENTION

1. Field of the Invention

This invention relates to feeder assemblies for delivering bar stock for processing by a machine tool and, more particularly, to a method and apparatus for removing unprocessed bar stock from the feeder assembly.

2. Background Art

It is known to process bar stock using different types of machine tools. In a typical system, a feeder assembly is utilized through which bar stock is delivered stepwise to a processing station at which any of a number of different operations can be performed thereon. As but one example, the bar stock is advanced to expose an end portion which is processed and cut from the remaining portion of the bar. The remaining portion of the bar is then advanced to repeat the same and/or a different processing step. This procedure is carried on repetitively until the bar length is reduced to a point that the remaining portion cannot be converted by processing into a usable form.

In one such system, the feeder assembly has a through passageway which is coaxial with the axis of a rotary spindle chuck. The bar stock is incrementally advanced and gripped by the chuck, whereupon the spindle is rotated to facilitate processing of the exposed bar stock material.

There are basically two different ways to advance the bar stock through the spindle. One technique involves pulling the bar stock from the downstream processing end. In one such system, a turret, which carries processing tools, also carries a puller which releasably grips the exposed leading/downstream end of the bar stock and draws it in an advancing direction sufficiently that it can be gripped to perform a processing operation thereon. Alternatively, the bar stock is pushed from a trailing/upstream end thereof to effect incremental advancement thereof through the spindle.

In many processing operations, the barstock is not matched to have a length that is an even multiple of the processed work piece length. As a result, there will remain an unusable piece of bar stock which must be removed from the feeder assembly before another longer piece of bar stock can be substituted therefor, advanced, and processed. If the unusable piece is of a sufficient length, a puller, such as that on the aforementioned turret adjacent to the processing location, can be used to separate the bar piece from the feeder assembly. Generally, this method is not preferred in that the unusable bar piece may not be conveniently removable from the feeder assembly at the processing location. Removal in this manner may cause interference with succeeding operations using the same processing equipment or with operations performed by other adjacent processing equipment.

The more preferable method of removing the unusable bar stock is to withdraw the same from the upstream end of the feeder assembly. To do so requires that the unusable piece of bar stock be grippable from the upstream end of a feeder tube and within the feeder tube by a pulling mechanism. In one conventional construction, a retrieval assembly has a gripper element that surrounds the upstream end of the bar stock so that the gripper element projects radially beyond the outer surface of the bar stock. The gripper element travel in a downstream direction within the feeder tube may be limited by any restriction therein, such as at a bearing, a restriction in a collet chuck, or the like. The restriction may be axially located so that it prevents the gripper element from engaging a portion of a piece of bar stock of sufficient length in a manner so as to allow another usable workpiece to be processed. As a result, an otherwise usable piece of bar stock is rendered scrap by the system limitations. An accumulation of unusable bar pieces, aside from causing inconvenience, may represent a significant financial loss, not only from the standpoint of material waste, but also by reason of requiring more frequent bar stock replacement, which interferes with ongoing processing efficiency.

SUMMARY OF THE INVENTION

In one form, the invention is directed to a method of processing a piece of bar stock material having spaced ends and a predetermined diameter. The method includes the steps of: attaching an adaptor to one end of the piece of bar stock material; directing the piece of bar stock material into a feeder sleeve bounding an internal passageway; moving the piece of bar stock material in the internal passageway from an upstream end of the internal passageway towards a downstream end of the internal passageway so as to expose a part of the piece of bar stock material for processing; performing at least one processing step on the exposed part of the piece of bar stock material; engaging a retrieval assembly with the adaptor; extending at least a part of the retrieval assembly into the internal passageway so that the at least part of the retrieval assembly does not project radially beyond the predetermined diameter from a downstream end of the at least part of the retrieval assembly to a predetermined distance in an upstream direction; and with the retrieval assembly engaged with the adaptor, repositioning the retrieval assembly to thereby reposition the piece of bar stock material within the internal passageway.

The adaptor may be attached to the piece of bar stock material before the piece of bar stock material is directed into the internal passageway. Alternatively, the adaptor may be attached to the piece of bar stock material with the piece of bar stock material extended at least partially into the internal passageway.

The adaptor may be attached to the one end of the piece of bar stock material in a number of different manners. As examples, the bar stock material may be attached by a spin welding process, by the use of a magnet, by a press-fit operation, through threaded engagement, etc.

The retrieval assembly may be engaged with the adaptor by a press-fitting operation.

In one form, the retrieval assembly has a first shoulder facing in a first direction, with the adaptor having a second shoulder facing oppositely to the first direction with the retrieval assembly engaged with the adaptor. The first and second shoulders abut each other so that the first shoulder acts against the second shoulder to cause the adaptor to follow movement of the retrieval assembly as the retrieval assembly repositions the piece of bar stock material.

At least one of the adaptor and retrieval assembly may be deformable to allow the first and second shoulders to be moved past each other and placed in facing relationship.

The method may further include the step of removing part of the piece of bar stock material during the performance of the at least one processing step so that a reduced size piece of the bar stock material resides at least partially in the internal passageway.

The method may include the step of removing the reduced size piece of the bar stock material from the internal passageway through the retrieval assembly.

The method may further include the step of separating the adaptor from the reduced size piece of bar stock material after the reduced size piece of bar stock material is removed from the internal passageway.

The adaptor that is separated from the reduced size piece of bar stock material may be attached to another piece of bar stock material.

The invention is also directed to a method of processing a piece of bar stock material having spaced ends between which an axis extends and a peripheral surface with a first effective diameter around the axis. The method includes the steps of: engaging a retrieval assembly with one end of the piece of bar stock material so that at least a part of the retrieval assembly has another, second, effective diameter that is not greater than the first effective diameter so that the piece of bar stock material will follow movement of the retrieval assembly in at least one direction along the axis; directing the piece of bar stock material into a feeder sleeve bounding the internal passageway; moving the piece of bar stock material in the internal passageway so as to expose a part of the piece of bar stock material for processing; performing at least one processing step on the exposed part of the piece of bar stock material; and with the retrieval assembly engaged with the piece of bar stock material, moving the retrieval assembly along the axis within the internal passageway and thereby moving the piece of bar stock material within the internal passageway.

The step of moving the piece of bar stock material may involve moving the piece of bar stock material from a position wherein the piece of bar stock material resides at least partially within the hollow passageway to a position wherein the piece of bar stock material is fully removed from the hollow passageway.

The step of engaging a retrieval assembly may involve attaching an adaptor to the one end of the piece of bar stock material and engaging the retrieval assembly with the adaptor. Alternatively, the retrieval assembly may be engaged directly with the piece of bar stock material.

The invention is also directed to the combination of: a piece of bar stock material having spaced ends between which an axis extends and a peripheral surface with a first effective diameter around the axis; an adaptor for attachment to one of the spaced ends of the piece of bar stock material with the adaptor in an operative position, wherein the adaptor does not project from the axis to beyond the first effective diameter of the peripheral surface; and a retrieval assembly engageable with the adaptor and which is repositionable to move the adaptor along the axis.

The retrieval assembly may be releasably attachable to the adaptor.

The combination may further include a feeder assembly including a sleeve with an internal passageway with a central axis and an effective diameter sufficiently large to receive the piece of bar stock material and least a part of the retrieval assembly.

The adaptor may be an element that is separate from and attached to the piece of bar stock material.

The invention is further directed to the combination of: a piece of bar stock material having spaced ends between which an axis extends and a peripheral surface with a first effective diameter around the axis; a retrieval assembly engageable with the piece of bar stock material so that the at least part of the retrieval assembly does not project radially beyond the first predetermined diameter from a downstream end of the at least part of the retrieval assembly to a predetermined distance in an upstream direction; and a feeder assembly having a sleeve with an internal passageway with a central axis and an effective diameter sufficiently large to receive the piece of bar stock material and at least part of the retrieval assembly.

DETAILED DESCRIPTION OF THE DRAWINGS

Figure 1:
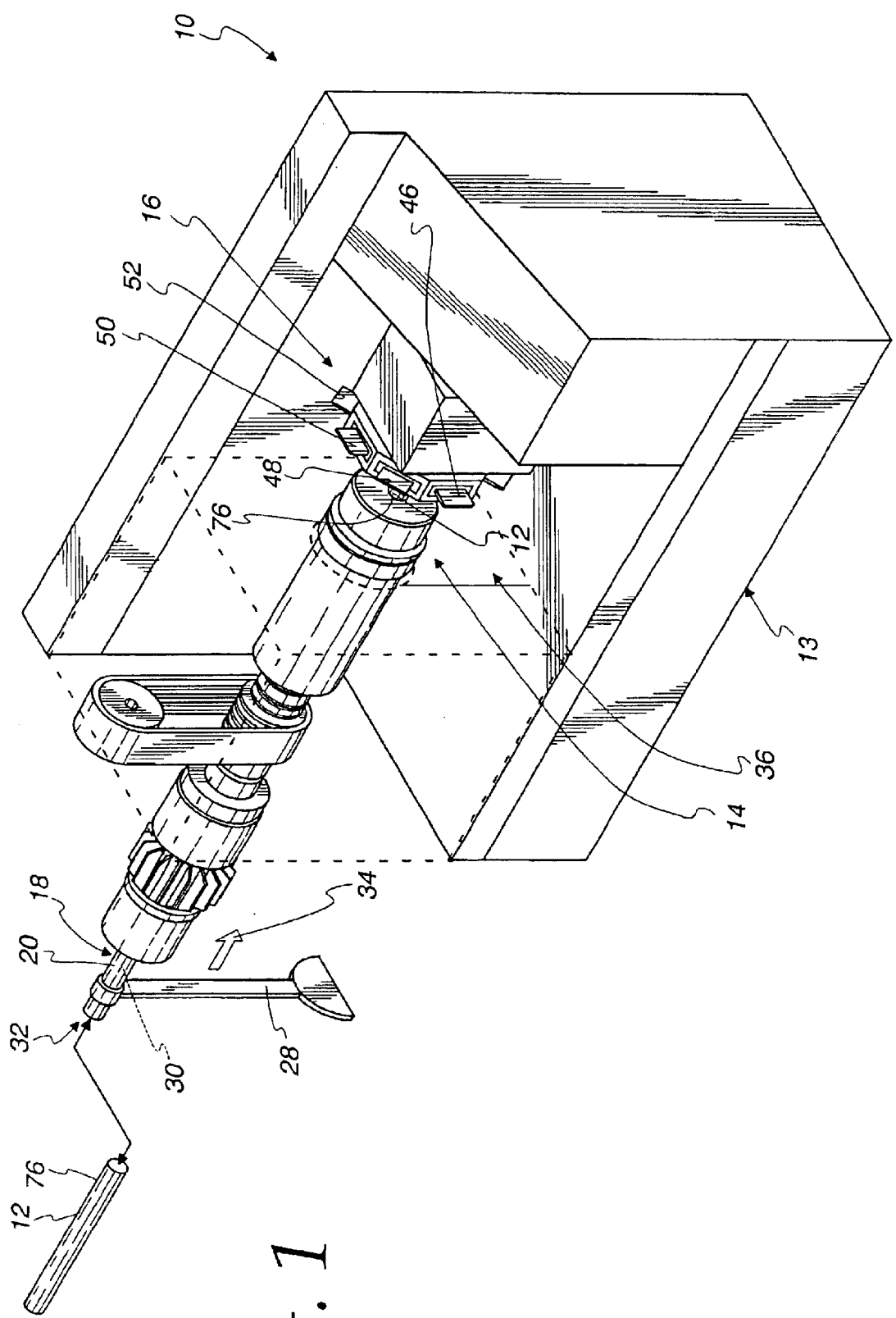
FIG. 1 is a perspective view of a machine tool of the type with which the present invention can be practiced and with the present invention incorporated therein.
Figure 2:
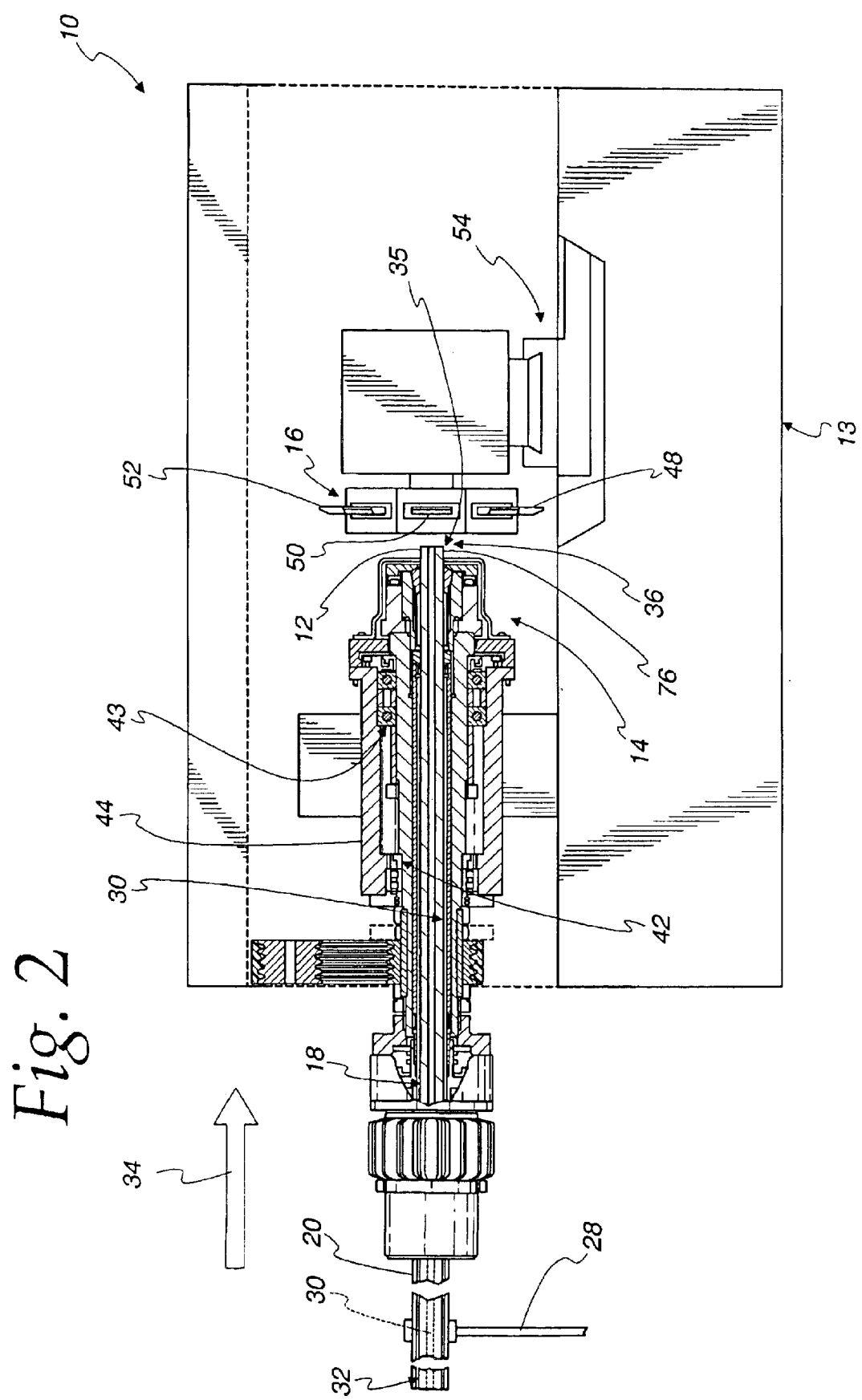
FIG. 2 is a side, partial cross-sectional, elevation view of the machine tool in FIG. 1.
Figure 3:
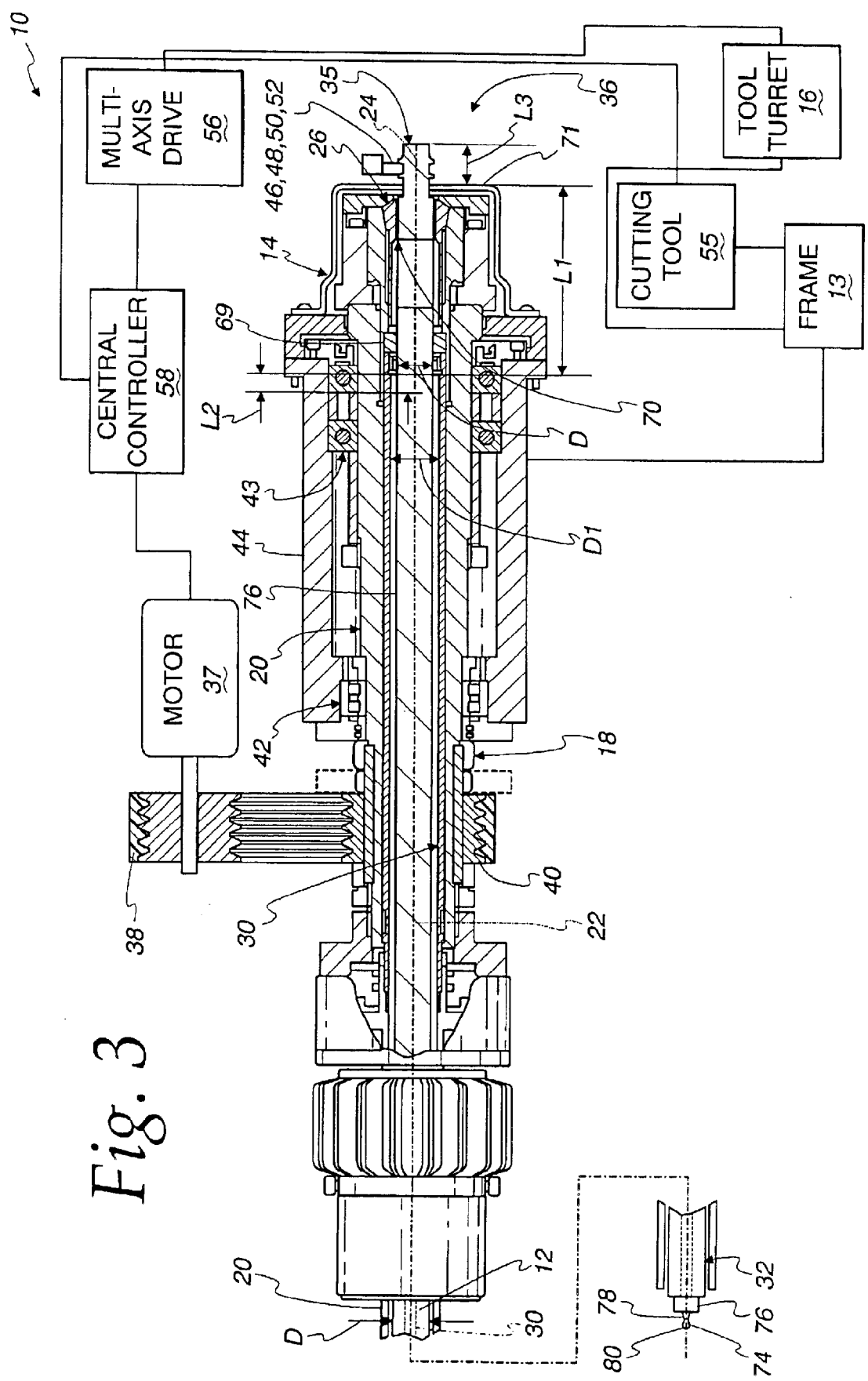
FIG. 3 is an enlarged, partial cross-sectional, partial schematic, view of the machine tool and feeder assembly of FIGS. 1 and 2 with a length of bar stock material having an adaptor, according to the present invention, attached to an end thereof and with the bar stock material being machined by a cutting tool.

In FIGS. 1–3, one exemplary environment for the present invention is shown. More specifically, in FIGS. 1–3 a machine tool is shown at 10 for processing elongate bar stock material 12. Bar stock material may be solid or hollow in construction and may have any cross-sectional configuration. Typically, each length of bar stock material 12 has a round cross-sectional configuration, as shown in only an exemplary manner herein.

The machine tool 10 consists of a frame 13 which supports a rotary spindle assembly 14 and a tool turret 16. The spindle assembly 14 has an associated feeder assembly 18 including a cylindrical, multi-part guide sleeve 20 having a central axis 22 that is coincident with the rotary axis 24 of a collet chuck 26 on the spindle assembly 14 and which releasably holds the bar stock material 12 in an operative position, as described hereinbelow. A brace element 28, shown schematically, reinforces the feeder assembly 18 at a location spaced from the frame 13.

In a typical processing operation, a length of the bar stock material 12 is directed into a hollow passageway 30 defined by the feeder assembly 18 at the upstream end 32 thereof. The length of bar stock material 12 is progressively moved downstream within the hollow passageway 30 in the direction of the arrow 34 to a position wherein a portion of the bar stock material 12 at the leading end 35 is exposed in a processing area 36 on the machine tool 10. With a desired length of the bar stock material 12 exposed, the collet chuck 26 is operated to clamp against the bar stock material 12 and thereby fix the bar stock material 12 to the spindle assembly 14 for rotation therewith.

The spindle assembly 14 is rotatable by a motor 37 which drives a power transmission belt 38 which in turn drives a pulley 40 connected to the spindle assembly 14. The spindle assembly 14 is guided smoothly in rotation by bearings 42, 43 interposed between the sleeve 20 and a fixed housing 44.

The tool turret 16 has individual cutting tools 46, 48, 50, 52 thereon, as shown in schematic form, which can be selectively indexed to perform a desired processing operation on the portion of the bar stock material 12 projected through the collet chuck 26 and exposed at the processing area 36. The tool turret 16 is mounted to the frame 13 in conventional fashion through a slide assembly 54 for multi-axis movement relative to the frame 13 and the bar stock material 12 held by the spindle assembly 14.

At the completion of the processing of the exposed portion of the bar stock material 12, a completed workpiece can be separated from the remainder of the bar stock material using a cutting tool 55. Coordinated operation of the motor 37, cutting tool 55, and multi-axis drive 56 for the tool turret 16 is accomplished through a central controller 58.

Once the processed portion of the barstock material 12 is separated, a portion of the bar stock material 12, of reduced size, remains within the hollow passageway 30. Typically, the starting bar stock material 12 has a length sufficient to allow several workpieces to be made therefrom. Upon completion of one workpiece, the reduced size portion of bar stock material is advanced from left to right in FIGS. 1–3 to allow the collet chuck 26 to grip the same with a sufficient length exposed to process another workpiece.

Figure 4:
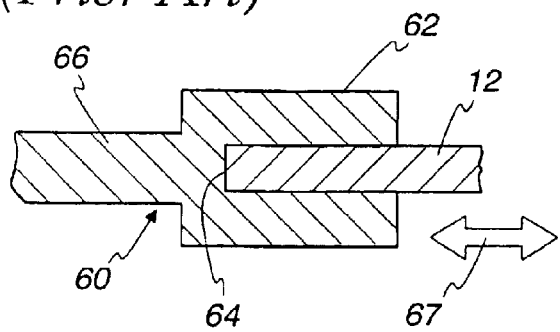
FIG. 4 is a fragmentary, cross-sectional view of a conventional pusher assembly for advancing bar stock in a feeder assembly of the type shown in FIGS. 1–3.
Figure 5:
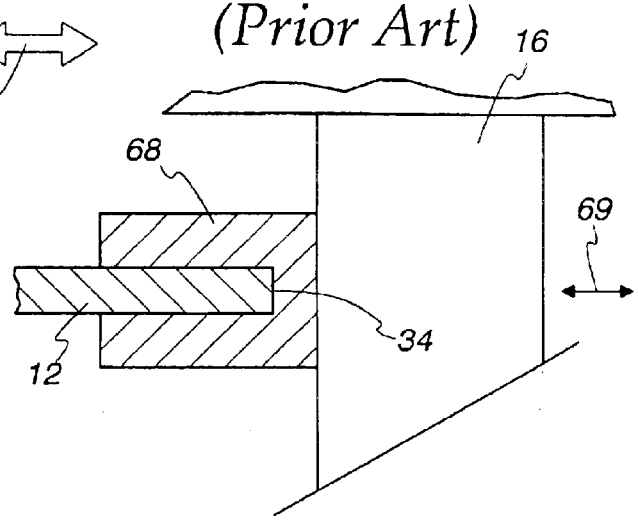
FIG. 5 is a fragmentary, partial cross-sectional view of a turret with a gripper to pull bar stock material in an advancing direction through a feeder assembly of the type shown in FIGS. 1–3.

Axial translation of the bar stock material 12 through the passageway 30 is generally carried out conventionally in two different manners, as shown in FIGS. 4 and 5. In FIG. 4, a feeder assembly is shown at 60 which includes a gripper 62 to surroundingly engage the upstream end 64 of the bar stock material 12. Through a rod 66, the gripper 62, and thus the bar stock material 12 held thereby, can be advanced along the line of the double-headed arrow 67 axially within the hollow passageway 30.

As an alternative, as shown in FIG. 5, a gripper 68 can be provided, as on the turret 16, to engage the downstream end 34 of the bar stock material 12. Through repositioning of the turret 16, as by translatory movement in the line of the double-headed arrow 69, the gripper 68 can be moved to reposition the bar stock material 12 within the hollow passageway 30 and to fully extract the bar stock material 12 from the hollow passageway 30.

One difficulty with using the turret 16 to remove the bar stock material 12 is that this removal takes place in the processing area 36. This may interfere with the basic operation of the machine tool 10. Additionally, the remaining portion of the bar stock material 12 must have a length sufficient to allow the gripper 68 to effect engagement therewith. This could lead to significant waste of the bar stock, a problem previously described.

In the event that the system of FIG. 4 is utilized to push the bar stock material progressively towards the processing area 36, the gripper 62, which is dimensioned to move within the passageway 30, may be limited in its downstream translation, by a restriction within the passageway, such as that at a collet bearing 69 (FIG. 3), or a restriction 70 in the collet chuck 26, which reduces the effective diameter of the passageway 30 thereat to less than the effective diameter of the outer surface of the gripper 62. The gripper 62 can engage and advance the bar stock material downstream only so long as the bar stock material has a length L1 in FIG. 3 extending from the upstream end of the collet bearing 69 to the downstream end 71 of the passageway 30 plus a) the additional length L2 required for the gripper 62 to engage the bar stock material and b) the projecting length L3 of the bar stock material required for processing. Accordingly, if the unused portion of the bar stock material 12 is to be withdrawn from or advanced in the hollow passageway 30 using the gripper 62 which cannot pass downstream past the collet bearing 70, the bar stock material 12 must have a length at least equal to the combined length L1+L2+L3. A combined length less than L1+L2+L3 may be greater than the required length for a completed workpiece. However, it could not be processed using the conventional gripper 62. In this situation, the bar stock material 12 is conventionally removed and potentially disposed of, whereas it might otherwise be usable to make one or more additional workpieces. A substantial amount of the bar stock may as a result be wasted.

Figure 6:
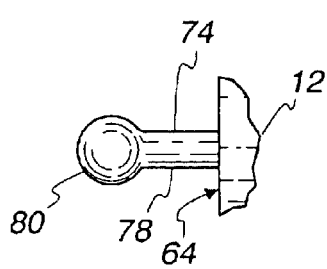
FIG. 6 is an enlarged, fragmentary, side elevation view of the adaptor on the piece of bar stock in FIG. 3.

To alleviate this problem, the invention contemplates a bar stock retrieval system constructed so that the bar stock material 12 can be selectively advanced and withdrawn in an axial direction within the hollow passageway 30 past a restriction in the passageway that will allow passage of the bar stock 12 but not the larger diameter gripper 62. One manner of facilitating this, according to the present invention, is to attach an adaptor 74 at the upstream end 64 of the bar stock material 12, as shown in FIGS. 3 and 6. The invention contemplates that the adaptor 74 can have a number of different configurations and could be attached to the bar stock material 12 in any of a number of different manners. It is preferred that the adaptor 74 not project from the axis 22 radially outwardly beyond the effective diameter D (FIG. 3) of the bar stock material 12. The "effective" diameter, as used throughout the description herein, is the smallest diameter of a cylinder coaxial with the bar stock material 12 that will contain the outer peripheral surface 76 of the bar stock material 12.

In the form shown in FIGS. 3 and 6, the adaptor 74 has a stem 78 with an enlarged head 80 on the end of the stem 78. The enlarged head 80 has a rounded shape. The head 80 is designed to cooperate with a retrieval assembly, as shown at 82 in FIG. 7. The retrieval assembly consists 82 of an elongate rod 84 with a fitting 86 at one end thereof. A drive 88 advances the rod 84 along the line of the double-headed arrow 90, i.e., parallel to the passageway axis 22. The fitting 86 consists of an enlargement 92 with a slot 94 therein that bifurcates the enlargement 92. Spaced enlargement parts 96,98 cooperatively define a receptacle 100 which is complementary to the peripheral outer surface 102 of the enlarged head 80 of the adaptor 74.

By advancing the fitting 86 against the enlarged head 80, the parts 96,98 are progressively cammed away from each other to the dotted line position, which allows the enlarged head 80 to seat in the receptacle 100. With the enlarged head 80 fully seated, an annular shoulder 104, bounding the receptacle 100, abuts to an oppositely facing annular shoulder 106 on the enlarged head 80. With this arrangement, right-to-left movement of the fitting 86 in FIG. 7 causes the shoulder 104 to bear on the shoulder 106 to urge the adaptor 74, and the bar stock material 12 attached thereto, in the same direction. This cooperative arrangement permits movement of the bar stock material 12 by the retrieval assembly 82 in opposite axial directions within the passageway 30.

Many variations of the retrieval assembly 82 and adaptor 74 are contemplated. As just one example, the rod 84 can be made with telescoping segments so as to be reconfigurable by varying the relationship of the telescoping sections to alter the effective length thereof.

Figure 7:
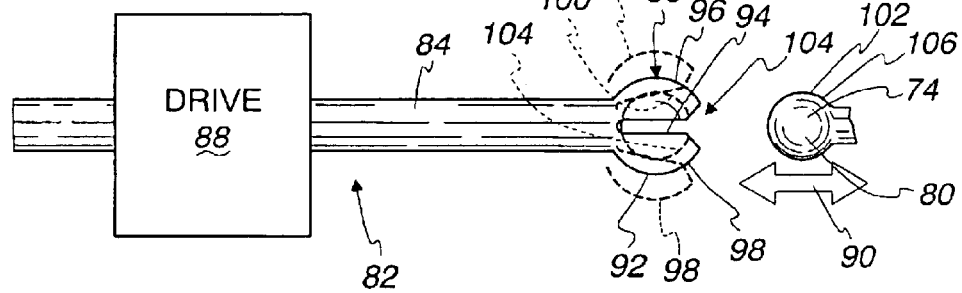
FIG. 7 is a side elevation view of a retrieval assembly, according to the present invention, for engaging the adaptor of FIG. 6, which is repositionable through the retrieval assembly, to translate the adaptor and thus the bar stock material attached thereto.
Figure 8:
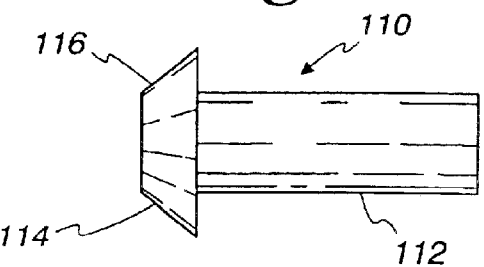
FIG. 8 is an enlarged, side elevation view of another form of adaptor, according to the present invention.

As far as the adaptor 74 is concerned, it can take a virtually limitless number of shapes different from that shown in FIG. 6. As just an example, an adaptor, as shown at 110 in FIG. 8, can be utilized with a stem 112 and an enlarged head 114 in the form of a truncated cone. A surface 116 thereon serves as a cam surface to progressively deform a complementary fitting (not shown) that operates generally as the fitting 86, as shown in FIG. 7.

Figure 9:
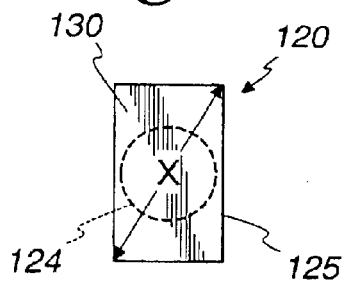
FIG. 9 is an enlarged, end elevation view of a further modified form of adaptor, according to the present invention.
Figure 10:
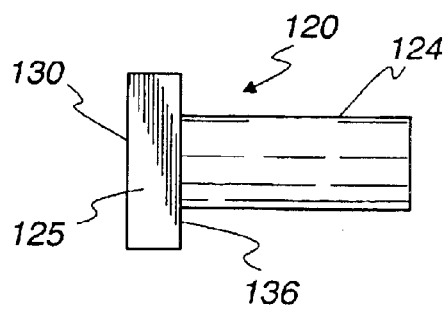
FIG. 10 is a side elevation view of the adaptor in FIG. 9.
Figure 11:
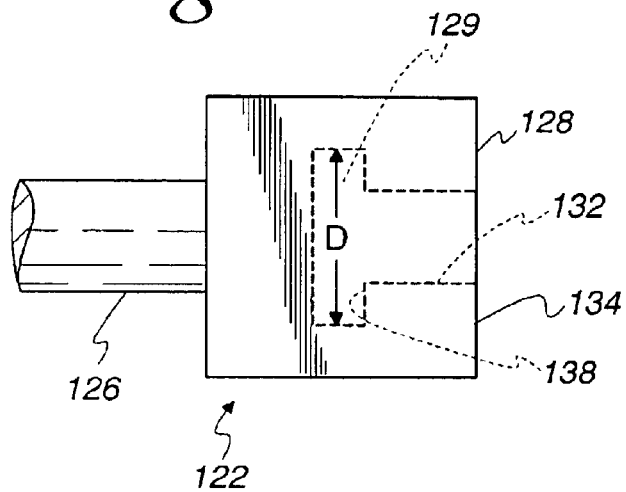
FIG. 11 is a fragmentary, side elevation view of a portion of a retrieval assembly, according to the present invention, for use with the adaptor in FIGS. 9 and 10.
Figure 12:
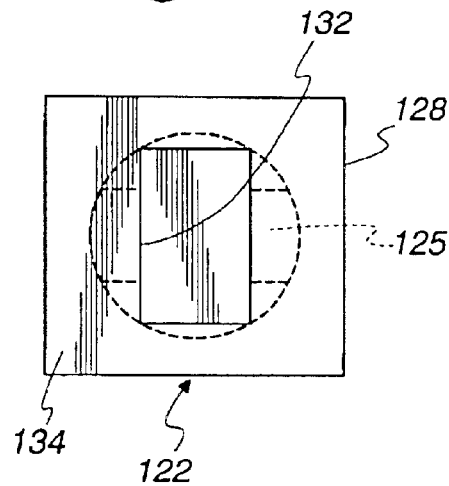
FIG. 12 is a front elevation view of the retrieval assembly in FIG. 11 with the retrieval assembly operatively engaged with the adapter in FIGS. 9 and 10.

As an alternative to using a deformable fitting, an adaptor, as shown at 120 in FIGS. 9 and 10, can be used, which adaptor 120 cooperates with a retrieval assembly as shown at 122 in FIGS. 11 and 12. The adaptor 120 has a stem 124 and a squared, enlarged head 125.

The retrieval assembly 122 consists of a rod 126 with a fitting 128 on an end thereof. The fitting 128 is in the form of a block with an internal, cylindrical chamber 129 having a diameter D at least equal to the diagonal dimension X of a leading face 130 of the enlarged head 125. An entry opening 132, having a shape and dimension corresponding to the front face 130, is provided through the front surface 134 of the fitting 128 and communicates from there to the chamber 129.

With this arrangement, the rod 126 can be advanced axially so that the adaptor moves within the passage 30. The retrieval assembly 122 and adaptor 120 can be relatively rotated to align the enlarged head 125 so that it can pass axially through the entry opening 132. By advancing the rod 126, the enlarged head 125 can be passed fully through the entry opening 132 and into the chamber 129, whereupon relative rotation between the retrieval assembly 122 and adaptor 124 causes the enlarged head 125 to assume the dotted line position in FIG. 12, wherein axial separation of the adaptor 120 and retrieval assembly 122 is precluded by abutment of the shoulder 136 on the enlarged head 125 and a confronting shoulder 138 bounding the chamber 129 on the fitting 128.

With this arrangement, the retrieval assembly 122 can be advanced towards the adaptor 120 to cause the head 125 to pass into the chamber 129, whereupon relative rotation between the retrieval assembly 122 and adaptor 120 places the enlarged head 125 in the FIG. 12 position. Withdrawal of the retrieval assembly 122 from the hollow passageway 30 thus draws the adaptor 120 and associated bar stock material 12. The retrieval assembly 122 so engaged can be used to move the engaged bar stock material 12 in opposite axial directions within the passageway 30.

Preferably, the radial dimension of the fittings 86, 128 is such that they do not exceed the effective diameter D of the opening through the collet bearing 69, and any like restriction 70 in the collet chuck 26, which is less than the diameter D1 of the hollow passageway 30, so that the fittings 86, 128 can be passed downstream through the collet bearing opening and collet chuck 26. Preferably, the radial dimensions of the fittings 86, 128 reside within the effective diameter of the piece of bar stock material 12 so as not to represent any impediment to translation of the bar stock material 12. Potentially then, the only restriction on downstream movement of the remaining piece of bar stock 12 is that it must be sufficiently long to be holdable by the collet chuck 26.

Figure 13:
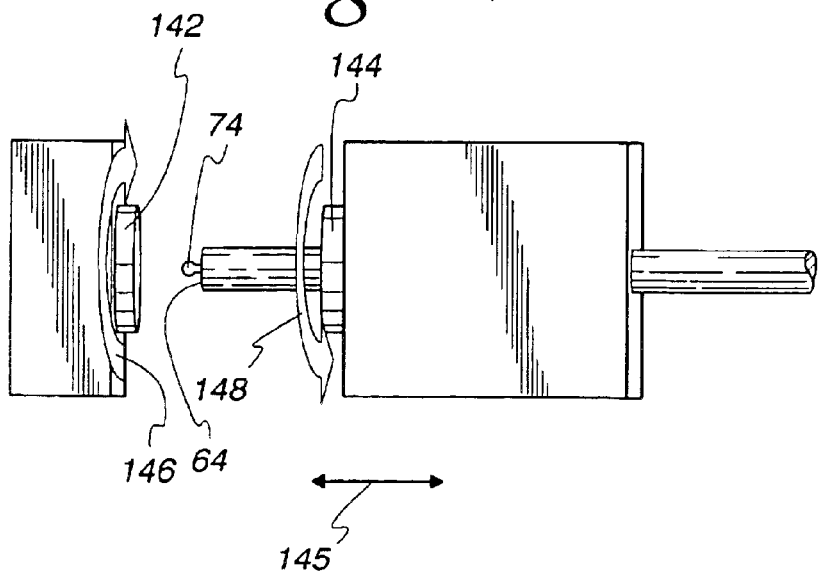
FIG. 13 is a side elevation view of a system for spin welding the adaptor of FIGS. 6–8 to a piece of bar stock material.

The adaptors 74, 110, 120 can be attached to the bar stock material 12 in a number of different manners. One manner of joining the exemplary adaptor 74 is described with respect to FIG. 13. In FIG. 13, the adaptor 74 is mounted on a first rotary spindle 142. The bar stock material 12 is mounted to a second rotary spindle 144. The spindles 142, 144 are relatively repositionable along the line of the double-headed arrow 145 so that the adaptor 74 can be abutted to the upstream end 64 of the bar stock material 12. With the adaptor 74 against the bar stock material 12, the spindles 142, 144 are relatively rotatable in opposite directions, as indicated by the arrows 146, 148, with pressure applied to cause a fusion of the adaptor 74 and bar stock material 12 through a spin welding process.

Figure 14:
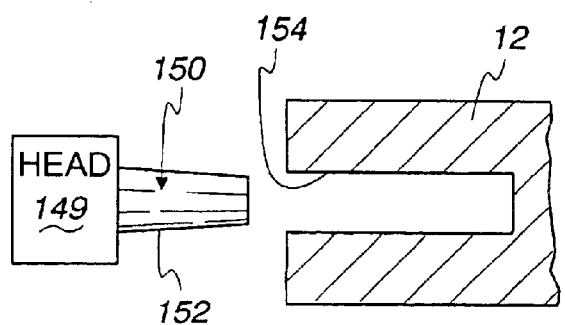
FIG. 14 is a fragmentary, partial cross-sectional, view showing another form of connection between an adaptor and a length of bar stock material, according to the present invention.
Figure 15:
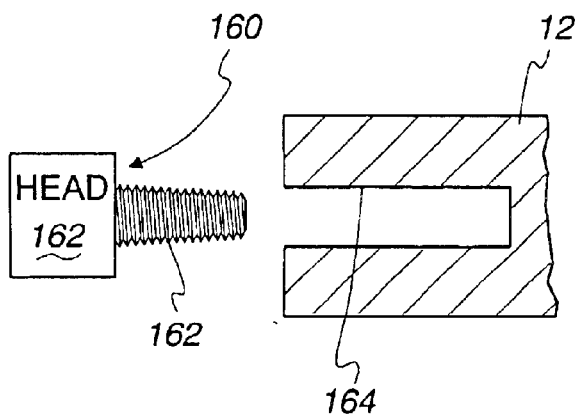
FIG. 15 is a view as in FIG. 14 of a further modified form of connection for an adaptor, according to the present invention.

Alternatively, as shown in FIG. 14, a head 149 connects to a stem 150, which has a tapered end 152 which can be press fit into a bore 154 in the bar stock material 12. The adaptor 150 can be attached by a press-fit step which may be carried out by a hammer blow, or continuous pressure application.

As a further alternative, an adaptor 160 with a head 162 has a threaded stem 162 which can be driven or threaded into a bore 164 in the bar stock material 12. The bore 164 can be threaded or unthreaded.

Many other variations of adaptors are contemplated by the invention. As just examples, the adaptors might be welded other than by spin welding, or held in place by an adhesive.

Figure 16:
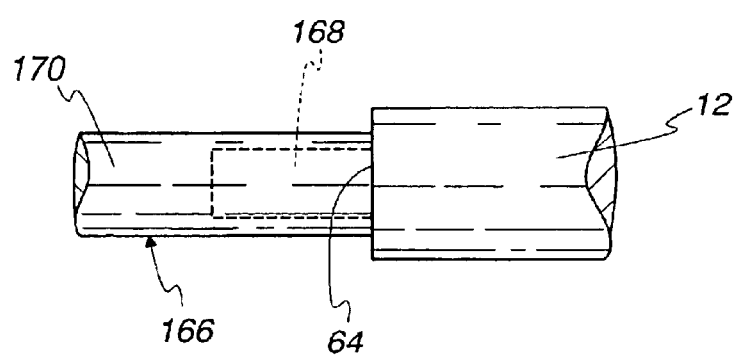
FIG. 16 is a fragmentary, side elevation view showing a further modified form of retrieval assembly, according to the present invention, using a magnet to connect to a length of bar stock material.

As a further alternative for practicing the invention, as shown in FIG. 16, a retrieval assembly 166 may be utilized with a magnet 168 incorporated into a rod 170. The rod 170 may shield the magnet 168 from the other components of the machine tool 10. With this arrangement, the rod 170 can be advanced until the magnet 168 attracts the end 64 of the bar stock material 12.

Regardless of the configuration of the adaptor and retrieval assembly, the processing of the piece of bar stock material 12 can be carried out in any of a number of different manners. For example, the adaptor can be attached to the bar stock material 12 either before or after the bar stock material 12 is introduced to the hollow passageway 30. The adaptor can be used to advance the bar stock material 12 as different machining operations are performed and progressively reduce the length of the bar stock material 12. Once the usable length of the bar stock material 12 is exhausted, the adaptor can be used to engage the retrieval assembly, which withdraws the unusable portion of the bar stock material fully out of the hollow passageway 30 through the upstream end 32 thereof. The retrieval assembly could also be used as a pusher to advance the bar stock fully through the spindle at the downstream end of the passageway 30.

The adaptors can be disposed of with the remaining length of bar stock material 12 or can be separated therefrom for re-use in the same manner as described above. The adaptors can be made from any material, including metal, plastic, etc. to carry out the function described above. It is only necessary that the adaptor have enough integrity and be attached to the bar stock material 12 with sufficient strength to allow the bar stock material 12 to be translated by manipulation of the adaptor. The manipulating portion of the retrieval assemblies can be directed into the hollow passageway 30 so that potentially the full usable length of the bar stock material 12 can be processed.

Figure 17:
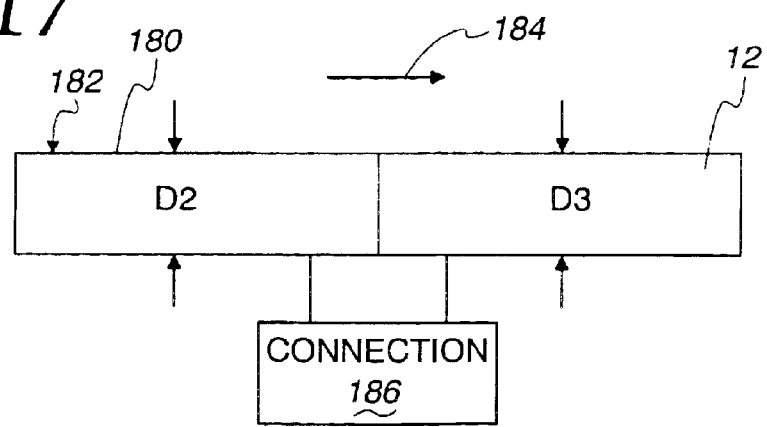
FIG. 17 is a generic representation of a retrieval assembly that is directly connected to a piece of bar stock material, according to the present invention without the need for an intermediate adaptor.

The invention also contemplates that the retrieval assembly could be engaged with the bar stock material without the use of any adaptor. As shown in FIG. 17, it is desirable with all embodiments that the effective diameter D2 of a moving part 180 of a retrieval assembly 182 within the passageway 30 be less than or equal to the effective diameter D3 of a piece of bar stock material 12. The moving part 180 of the retrieval assembly 182 may be advanced in the downstream direction, as indicated by the arrow 184 fully through the passageway 30 and potentially fully through the spindle assembly 14. To function in this manner only as a pusher, the moving part 180 of the retrieval assembly 182 need not be connected to the bar stock material.

To function to retrieval/move the bar stock material 12 in an upstream direction, the moving part 80 is connected to the piece of bar stock 12. In FIG. 17, a generic connection is shown at 186. The connection can be effected by an adhesive, soldering, a weld, magnets, etc. Virtually any connection that causes the bar stock material 12 to follow upstream translation of the moving part 180 can be used. Preferably the effective diameter at the connection does not project beyond the diameter D3 of the outer surface of the bar stock material 12.

The foregoing disclosure of specific embodiments is intended to be illustrative of the broad concepts comprehended by the invention.

I claim:

1. A method of processing a piece of bar stock material having spaced ends and a predetermined diameter, said method comprising the steps of:
    attaching an adaptor to one end of the piece of bar stock material;
    directing the piece of bar stock material into a feeder sleeve bounding an internal passageway;
    moving the piece of bar stock material in the internal passageway from an upstream end of the internal passageway towards a downstream end of the internal passageway so as to expose a part of the piece of bar stock material for processing;
    performing at least one processing step on the exposed part of the piece of bar stock material;
    engaging a retrieval assembly with the adaptor;
    extending at least a part of the retrieval assembly into the internal passageway so that no part of the retrieval assembly projects radially beyond the predetermined diameter from a downstream end of the at least part of the retrieval assembly to a predetermined distance in an upstream direction; and
    with the retrieval assembly engaged with the adaptor, repositioning the retrieval assembly to thereby reposition the piece of bar stock material within the internal passageway.

2. The method of processing a piece of bar stock material according to claim 1 wherein the adaptor is attached to the piece of bar stock material before the piece of bar stock material is directed into the internal passageway.

3. The method of processing a piece of bar stock material according to claim 1 wherein the adaptor is attached to the one end of the piece of bar stock material by a press-fitting operation.

4. The method of processing a piece of bar stock material according to claim 1 wherein the retrieval assembly is engaged with the adaptor by a press-fitting operation.

5. The method of processing a piece of bar stock material according to claim 1 further comprising the step of removing part of the piece of bar stock material during the performance of the at least one processing step so that a reduced size piece of the bar stock material resides in the passageway.

6. The method of processing a piece of bar stock material according to claim 5 further comprising the step of removing the reduced size piece of the bar stock material from the passageway through the retrieval assembly.

7. The method of processing a piece of bar stock material according to claim 6 further comprising the step of separating the adaptor from the reduced size piece of bar stock material after the reduced size piece of bar stock material is removed from the passageway.

8. The method of processing a piece of bar stock material according to claim 7 further comprising the step of attaching the adaptor separated from the reduced size piece of bar stock material to another piece of bar stock material.

9. A method of processing a piece of bar stock material having spaced ends and a predetermined diameter, said method comprising the steps of:
    attaching an adaptor to one end of the piece of bar stock material;
    directing the piece of bar stock material into a feeder sleeve bounding an internal passageway;
    moving the piece of bar stock material in the internal passageway from an upstream end of the internal passageway towards a downstream end of the internal passageway so as to expose a part of the piece of bar stock material for processing;
    performing at least one processing step on the exposed part of the piece of bar stock material;
    engaging a retrieval assembly with the adaptor;
    extending at least a part of the retrieval assembly into the internal passageway so that the at least part of the retrieval assembly does not project radially beyond the predetermined diameter from a downstream end of the at least part of the retrieval assembly to a predetermined distance in an upstream direction; and
    with the retrieval assembly engaged with the adaptor, repositioning the retrieval assembly to thereby reposition the piece of bar stock material within the internal passageway,
    wherein the adaptor is attached to the piece of bar stock material with the piece of bar stock material extending at least partially into the internal passageway.

10. A method of processing a piece of bar stock material having spaced ends and a predetermined diameter, said method comprising the steps of:
    attaching an adaptor to one end of the piece of bar stock material;

directing the piece of bar stock material into a feeder sleeve bounding an internal passageway;

moving the piece of bar stock material in the internal passageway from an upstream end of the internal passageway towards a downstream end of the internal passageway so as to expose a part of the piece of bar stock material for processing;

performing at least one processing step on the exposed part of the piece of bar stock material;

engaging a retrieval assembly with the adaptor;

extending at least a part of the retrieval assembly into the internal passageway from a downstream end of the at least part of the retrieval assembly to a predetermined distance in an upstream direction; and with the retrieval assembly engaged with the adaptor, repositioning the retrieval assembly to thereby reposition the piece of bar stock material within the internal passageway, wherein the adaptor is attached to the one end of the piece of bar stock material by a spin welding process.

11. The method of processing a piece of bar stock material according to claim 10 wherein the step of extending at least a part of the retrieval assembly into the internal passageway comprises extending at least a part of the retrieval assembly into the internal passageway so that the at least part of the retrieval assembly does not project radially beyond the predetermined diameter.

12. A method of processing a piece of bar stock material having spaced ends and a predetermined diameter, said method comprising the steps of:

attaching an adaptor to one end of the piece of bar stock material;

directing the piece of bar stock material into a feeder sleeve bounding an internal passageway;

moving the piece of bar stock material in the internal passageway from an upstream end of the internal passageway towards a downstream end of the internal passageway so as to expose a part of the piece of bar stock material for processing;

performing at least one processing step on the exposed part of the piece of bar stock material;

engaging a retrieval assembly with the adaptor;

extending at least a part of the retrieval assembly into the internal passageway from a downstream end of the at least part of the retrieval assembly to a predetermined distance in an upstream direction; and with the retrieval assembly engaged with the adaptor, repositioning the retrieval assembly to thereby reposition the piece of bar stock material within the internal passageway, wherein the adaptor is attached to the one end of the piece of bar stock material through the use of a magnet.

13. The method of processing a piece of bar stock material according to claim 12 wherein the step of extending at least a part of the retrieval assembly into the internal passageway comprises extending at least a part of the retrieval assembly into the internal passageway so that the at least part of the retrieval assembly does not project radially beyond the predetermined diameter.

14. A method of processing a piece of bar stock material having spaced ends and a predetermined diameter, said method comprising the steps of:

attaching an adaptor to one end of the piece of bar stock material;

directing the piece of bar stock material into a feeder sleeve bounding an internal passageway;

moving the piece of bar stock material in the internal passageway from an upstream end of the internal passageway towards a downstream end of the internal passageway so as to expose a part of the piece of bar stock material for processing;

performing at least one processing step on the exposed part of the piece of bar stock material;

engaging a retrieval assembly with the adaptor;

extending at least a part of the retrieval assembly into the internal passageway from a downstream end of the at least part of the retrieval assembly to a predetermined distance in an upstream direction; and with the retrieval assembly engaged with the adaptor, repositioning the retrieval assembly to thereby reposition the piece of bar stock material within the internal passageway, wherein the adaptor is threadably attached to the one end of the piece of bar stock material.

15. The method of processing a piece of bar stock material according to claim 14 wherein the step of extending at least a part of the retrieval assembly into the internal passageway comprises extending at least a part of the retrieval assembly into the internal passageway so that the at least part of the retrieval assembly does not project radially beyond the predetermined diameter.

16. A method of processing a piece of bar stock material having spaced ends and a predetermined diameter, said method comprising the steps of:

attaching an adaptor to one end of the piece of bar stock material;

directing the piece of bar stock material into a feeder sleeve bounding an internal passageway;

moving the piece of bar stock material in the internal passageway from an upstream end of the internal passageway towards a downstream end of the internal passageway so as to expose a part of the piece of bar stock material for processing;

performing at least one processing step on the exposed part of the piece of bar stock material;

engaging a retrieval assembly with the adaptor;

extending at least a part of the retrieval assembly into the internal passageway from a downstream end of the at least part of the retrieval assembly to a predetermined distance in an upstream direction; and with the retrieval assembly engaged with the adaptor, repositioning the retrieval assembly to thereby reposition the piece of bar stock material within the internal passageway, wherein the retrieval assembly has a first shoulder facing in a first direction and the adaptor has a second shoulder facing oppositely to the first direction, with the retrieval assembly engaged with the adaptor, the first and second shoulders abut each other and the first shoulder acts against the second shoulder to cause the adaptor to follow movement of the retrieval assembly as the retrieval assembly repositions the piece of bar stock material.

17. The method of processing a piece of bar stock material according to claim 16 wherein at least one of the adaptor and retrieval assembly is deformable to allow the first and second shoulders to be moved past each other and placed in facing relationship.

18. The method of processing a piece of bar stock material according to claim 16 wherein the step of extending at least a part of the retrieval assembly into the internal passageway comprises extending at least a part of the retrieval assembly into the internal passageway so that the at least part of the retrieval assembly does not project radially beyond the predetermined diameter.

19. A method of processing a piece of bar stock material having spaced ends between which an axis extends and a peripheral surface with a first effective diameter around the axis, said method comprising the steps of:

engaging a retrieval assembly with one end of the piece of bar stock material so that no part of the retrieval assembly at a location at which the retrieval assembly engages the bar stock material has an outer, effective diameter that is greater than the first effective diameter and so that the piece of bar stock material will follow movement of the retrieval assembly in at least one direction along the axis;

directing the piece of bar stock material into a feeder sleeve bounding an internal passageway;

moving the piece of bar stock material in the internal passageway so as to expose a part of the piece of bar stock material for processing;

performing at least one processing step on the exposed part of the piece of bar stock material; and with the retrieval assembly engaged with the piece of bar stock material, moving the retrieval assembly along the axis within the internal passageway and thereby moving the piece of bar stock material within the internal passageway.

20. A method of processing a piece of bar stock material according to claim 19 wherein the step of moving the piece of bar stock material comprises moving the piece of bar stock material from a position wherein the piece of bar stock material resides at least partially within the hollow passageway to a position wherein the piece of bar stock material is fully removed from the hollow passageway.

21. The method of processing a piece of bar stock material according to claim 19 wherein the step of engaging a retrieval assembly comprises attaching an adaptor to the one end of the piece of bar stock material and engaging the retrieval assembly with the adaptor.

22. The method of processing a piece of bar stock material according to claim 19 wherein the step of engaging a retrieval assembly comprises engaging the retrieval assembly directly with the one end of the piece of bar stock material.

23. A bar stock retrieval system comprising:

a piece of bar stock material having spaced ends between which an axis extends and a peripheral surface with a first effective diameter around the axis;

an adaptor at one of the spaced ends of the piece of bar stock material with the adaptor in an operative position, wherein the adaptor does not project from the axis to beyond the first effective diameter of the peripheral surface; and a retrieval assembly engageable with the adaptor and which is repositionable to move the adaptor along the axis.

24. The bar stock retrieval system according to claim 23 wherein the retrieval assembly is releasably attachable to the adaptor.

25. The bar stock retrieval system according to claim 23 further in combination with a feeder assembly comprising a sleeve with an internal passageway with a central axis and an effective diameter sufficiently large to receive the piece of bar stock material and at least a part of the retrieval assembly.

26. The bar stock retrieval system according to claim 23 wherein the adaptor is an element that is separate from and attached to the piece of bar stock material.

27. A bar stock retrieval system comprising:

a piece of bar stock material having spaced ends between which an axis extends and a peripheral surface with a first effective diameter around the axis;

a retrieval assembly engageable with the piece of bar stock material so that the at least part of the retrieval assembly at a location at which the retrieval assembly engages the bar stock material does not project radially beyond the first predetermined diameter from a downstream end of the at least part of the retrieval assembly to a predetermined distance in an upstream direction; and a feeder assembly comprising a sleeve with an internal passageway with a central axis and an effective diameter sufficiently large to receive the piece of bar stock material and the at least a part of the retrieval assembly.

* * * * *